May 15, 1962 J. C. DAWSON Re. 25,172

LIQUID DISPENSING APPARATUS

Original Filed June 9, 1958

Joseph Carl Dawson,
Inventor.
Koenig and Pope,
Attorneys.

United States Patent Office

Re. 25,172
Reissued May 15, 1962

25,172
LIQUID DISPENSING APPARATUS

Joseph Carl Dawson, Ferguson, Mo.

Original No. 2,895,649, dated July 21, 1959, Ser. No. 740,777, June 9, 1958. Application for reissue May 10, 1961, Ser. No. 110,309
8 Claims. (Cl. 222—318)

Matter enclosed in heavy brackets [ ] appears in the original patent but forms no part of this reissue specification; matter printed in italics indicates the additions made by reissue.

This invention relates to liquid dispensing apparatus, and more particularly to apparatus for dispensing measured dosages of a liquid fumigant or the like.

Among the several objects of the invention may be noted the provision of portable apparatus for dispensing through a delivery hose small measured dosages of a liquid fumigant or the like, and more particularly a fumigant such as is disclosed in my U.S. Patent 2,606,857, for spot fumigation in cereal mills for continuous infestation control, the apparatus being supplied with liquid fumigant from a source under pressure, and being operable by this pressure under control of a manually operable delivery valve at the end of the delivery hose; the provision of apparatus of this class which may be readily completely primed (i.e., initially filled with liquid from the source all the way to the delivery valve); the provision of apparatus of this class which is adapted to be supplied wtih liquid from the source under pressure via a relatively long supply hose line; and the provision of apparatus having the stated characteristics which is economical to manufacture and maintain and reliable in operation. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a plan view of a liquid dispensing apparatus of this invention;

Corresponding reference characters indicate corresponding parts throughout the several views of the drawings.

Figure 1:
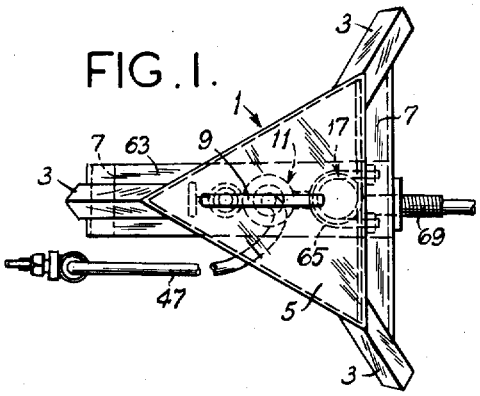

Referring to the drawings, a liquid dispensing apparatus of this invention is shown to comprise a portable support generally designated 1 in the form of a tripod having legs 3, a head plate 5, and cross braces such as indicated at 7. A carrying handle 9 is secured to the head plate. Mounted in the tripod is an assembly designated in its entirety by the reference character 11 and including a vertical cylinder 13, a by-pass 15 for this cylinder, and an air chamber 17 having its lower end in communication with the lower end of the cylinder 13. In the by-pass 15 there is an adjustable valve 19. This may be a conventional needle valve, for example.

More particularly, the cylinder 13 comprises a tube 21 having an upper end head 23 and a lower end head 25. The lower end head 25 has an upwardly extending nipple 27 projecting upward into the tube, and has a passage 29 for flow of liquid upward through the nipple into the tube. Attached to the lower end head 25 is the stem of a T 31. A short length of pipe 33 extends from one side of the T 31 and has a T 35 secured to one end thereof. The stem of the T 35 is secured to the lower end of the air chamber 17. An elbow 37 is secured to the other side of the T 31. A supply hose 39 (which may be a plastic hose, such as a polyethylene hose) is secured to the T 35 on the other side from pipe 33. This hose 39 is adapted to be connected to a source of liquid under pressure (not shown). It may be relatively long (one hundred feet long, for example).

The upper end head 23 of tube 21 is formed with an annular shoulder 41 which constitutes a valve seat. A T 43 has one side secured to the upper end head 23. An elbow 45 is secured to the stem of the T 43. A delivery hose 47 (which may be a plastic hose, such as a polyethylene hose) extends from the other side (the upper end) of T 43. The by-pass valve 19 has one end secured to the lower elbow 37 and its other end connected to the upper elbow 45 by a length of plastic hose 49. Valve 19 has a handle or knob 51 for adjustment thereof to vary the extent of the opening of the passage through the valve 19. This may be varied from a relatively small orifice to a relatively wide opening.

Figure 2:
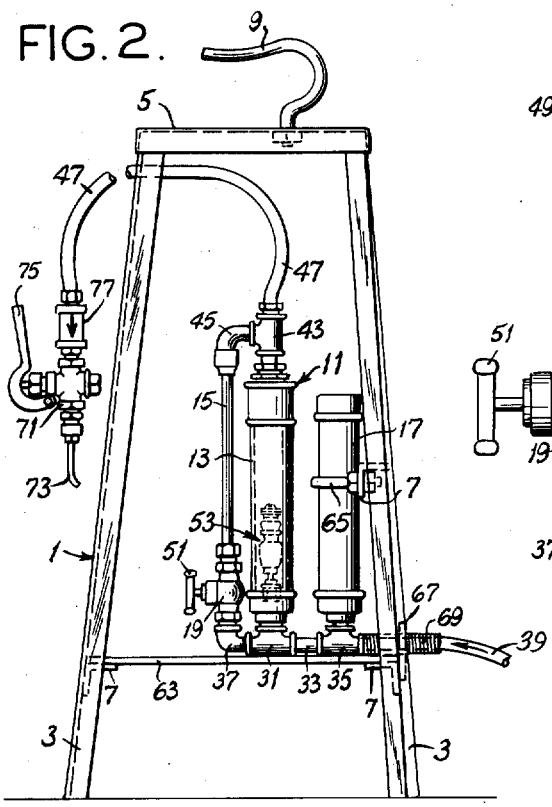
FIG. 2 is a side elevation of FIG. 1.

A valve member generally designated 53 is vertically movable in the tube 21 of cylinder 13. This valve member 53 comprises a weight 55 (a body of [leads] *lead*, for example), having at its upper end two vertically spaced horizontal disks 57 and 59 which may be made of plastice such as polyethylene. The upper disc 57 is a valve disk engageable with the shoulder or seat 41 to cut off flow from the upper end of the cylinder 13 to the delivery hose 47. The lower disk 59 serves as a piston whereby the valve member 53 is adapted to rise in the cylinder from an initial position at the lower end of the cylinder (illustrated in dotted lines in FIG. 2) in response to a pressure drop in the cylinder above valve member 53. Both disks have a relatively loose fit in the cylinder so that the valve member 53, without undue impedance, is adapted to sink to the lower end of the cylinder under the gravity bias of its weight upon equalization of pressure above and below valve member 53. *This is because the weight of the volume of the liquid in the cylinder displaced by the valve member (which is made of lead, for example) is less than the weight of the valve member. Accordingly, the weight of the volume of the liquid in the cylinder displaced by the valve member is such in relation to the weight of the valve member that the valve member tends to move toward the inlet end of the cylinder.* At the lower end of the weight 55 is an inverted cup 61 which covers nipple 27 when the valve member 53 is at the lower end of the cylinder 13. The upper disk may be made of a metal-backed synthetic rubber resistant to the liquid, and the lower disk may be made of metal such as brass.

The assembly 11 is held in the tripod 1, bearing on a horizontal crossbar 63, as by means of a U-bolt 65 straddling the air chamber 17 and secured to an upper brace 7. The supply hose 37 extends through a brace member such as indicated at 67 and a coil spring 69 may be provided around the supply hose where it extends through member 67 to protect the hose. At the outer end of the delivery hose 47 is a manually operable delivery valve 71 of a conventional type having a delivery nozzle 73 and a manually operable lever 75 for opening it. The delivery valve includes a check valve 77 adapted to open in the direction indicated by the arrow in FIG. 2 under pressure in the delivery hose when the delivery valve is opened.

Operation is as follows:

The supply hose line 37 is connected to a source of liquid under pressure (not shown) such as a pressurized supply tank. The pressure in hose 37 is preferably regulated to be, for example, about fifty to seventy-five pounds per square inch. When such pressure is employed, the check valve 77 is one that is adapted to open under about ten pounds per square inch pressure in the delivery hose line 47. The by-pass valve 19 is opened wide to allow liquid to flow freely through the by-pass 15 to the delivery hose line 47 to prime the apparatus.

Then the by-pass valve 19 is turned down to provide a restriction in the by-pass 15 such as to effect a pressure drop in cylinder 13 above the valve member 53 whenever the manually operable delivery valve 71 is operated.

Figure 3:
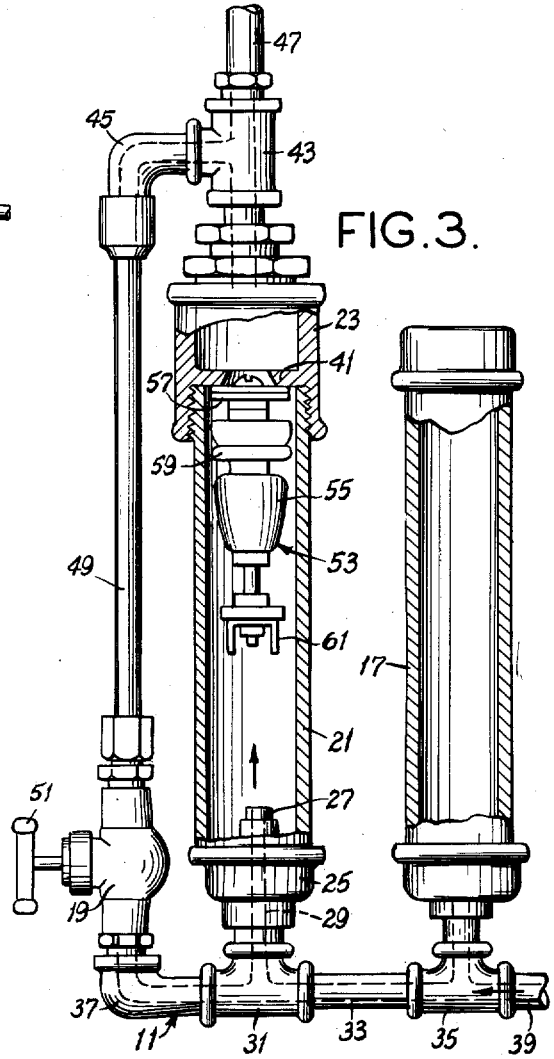
FIG. 3 is an enlarged view of a portion of FIG. 2, with parts broken away and shown in section.

Thus, when the delivery valve 71 is opened, the pressure in the delivery hose 47 is released, and there is a pressure drop in the cylinder 13 above the valve member 53, which at this time is at the lower end of the cylinder 13 with cup 61 covering nipple 27. The restriction provided in the by-pass 15 by the valve 19 is sufficiently small to preclude such flow of liquid through the by-pass as would materially reduce this pressure drop. Accordingly, the valve member 53 is driven upward by the pressure below it in cylinder 13 and rises to the upper end of cylinder 13. As it rises, it forces liquid out of the upper end of the cylinder 13 and through the delivery hose 47 to deliver a measured dose of liquid through the nozzle 73 of the delivery valve 71. Upon rising to the upper end of the cylinder 13, the valve disk 57 engages the seat 41 as shown in FIG. 3 to cut off delivery (except for the negligible amount that leaks through the restriction in the by-pass provided by valve 19). Upon such cut-off, the pressure in the delivery hose 47 drops below that required to maintain the check valve 77 open, and this check valve closes to keep the delivery hose primed, even though the operator should not at once release the lever 75 of the delivery valve 71 to allow it to close. However, the cut-off is readily sensed by feel so that the operator may immediately release the lever 75 to close the delivery valve 71.

With the delivery valve 71 closed, pressure from the supply hose bleeds through the restriction in by-pass 15 provided by valve 19, and the pressure above and below the valve member 53 equalizes, whereupon the valve member 53 sinks down to the lower end of the cylinder 13. When it reaches the lower end of the cylinder, the apparatus is ready for the next operation.

With liquid under pressure in the delivery hose 39, a supply of compressed air is maintained in the air chamber 17 above the level of liquid in the chamber. This chamber being close to the cylinder 13, the compressed air therein is effective on opening the delivery valve 71 for application of pressure to the liquid at the lower end of the cylinder 13 to offset the inertia of liquid and the loss of head in supply hose 39 from the source of liquid under pressure to the dispensing apparatus. This is particularly useful in case the supply hose is of such length (one hundred feet, for example) that the liquid therein has considerable inertia and is of such character as to have a substantial friction head.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Apparatus for dispensing measured dosages of a liquid, such as a liquid fumigant, comprising a vertical cylinder having an inlet at its lower end and an outlet at its upper end, a hose line for supplying liquid under pressure to the cylinder having a connection to the cylinder inlet, said cylinder having a valve seat at its upper end, a vertically movable valve member in the cylinder, said valve member being adapted to sink to the lower end of the cylinder, and being adapted to rise in the cylinder in response to a pressure drop in the cylinder above the valve member and force out liquid through the cylinder outlet, said valve member, upon rising to the upper end of the cylinder, being engageable with said valve seat to cut off flow from the upper end of the cylinder, a delivery hose having a connection to the cylinder outlet, a manually operable delivery valve at the outer end of the delivery hose, a by-pass around the cylinder providing for communication from the supply hose to the cylinder outlet above the valve seat, and a valve in the by-pass adapted to provide a restriction in the by-pass such as to effect a pressure drop in the cylinder above said valve member upon operation of said manually operable valve and adapted to provide for equalization of pressure above and below said valve member after the latter has risen into engagement with said valve seat and said manually operable valve is closed, whereupon the valve member sinks to the lower end of the cylinder.

2. Apparatus for dispensing measured dosages of a liquid, such as a liquid fumigant, comprising a vertical cylinder having an inlet at its lower end and an outlet at its upper end, a hose line for supplying liquid under pressure to the cylinder having a connection to the cylinder inlet, said cylinder having a valve seat at its upper end, a vertically movable valve member in the cylinder, said valve member being weighted so that it is adapted to sink to the lower end of the cylinder, and being adapted to rise in the cylinder in response to a pressure drop in the cylinder above the valve member and force out liquid through the cylinder outlet, said valve member, upon rising to the upper end of the cylinder, being engageable with said valve seat to cut off flow from the upper end of the cylinder, a delivery hose having a connection to the cylinder outlet, a manually operable delivery valve at the outer end of the delivery hose, said manually operable valve including a check valve adapted to open for delivery of liquid upon operation of said manually operable valve and to close upon a reduction of pressure in the delivery hose below a predetermined limit, a by-pass around the cylinder providing for communication from the supply hose to the cylinder outlet above the valve seat, and a valve in the by-pass adapted to provide a restriction in the by-pass such as to effect a pressure drop in the cylinder above said valve member upon operation of said manually operable valve and adapted to provide for equalization of pressure above and below said valve member after the latter has risen into engagement with said valve seat and said manually operable valve is closed, whereupon the valve member sinks to the lower end of the cylinder, said by-pass valve also being adapted to be opened wide for priming.

3. Apparatus for dispensing measured dosages of a liquid, such as a liquid fumigant, comprising a portable support, a vertical elongate cylinder carried by the support having an inlet at its lower end and an outlet at its upper end, a hose line for supplying liquid under pressure to the cylinder having a connection to the cylinder inlet, said cylinder having a valve seat at its upper end, a vertically movable valve member in the cylinder, said valve member being weighted so that it is adapted to sink to the lower end of the cylinder, and being adapted to rise in the cylinder in response to a pressure drop in the cylinder above the valve member and force out liquid through the cylinder outlet, said valve member, upon rising to the upper end of the cylinder, being engageable with said valve seat to cut off flow from the upper end of the cylinder, a delivery hose having a connection to the cylinder outlet, a manually operable delivery valve at the outer end of the delivery hose, said manually operable valve including a check valve adapted to open for delivery of liquid upon operation of said manually operable valve and to close upon a reduction of pressure in the delivery hose below a predetermined limit, a by-pass around the cylinder providing for communication from the supply hose to the cylinder outlet above the valve seat, a valve in the by-pass adapted to provide a restriction in the by-pass such as to effect a pressure drop in the cylinder above said valve member upon operation of said manually operable valve and adapted to provide for equalization of pressure above and below said valve member after the latter has risen into engagement with said valve seat and said manually operable valve is closed, whereupon the valve member sinks to the lower end of the cylinder, said by-pass valve also being adapted to be opened wide for priming, and an air chamber carried by the support adjacent the cylinder having its lower end in communication with the supply hose.

4. Apparatus as set forth in claim 3 wherein the cylinder has an upwardly projecting nipple at its lower end through which liquid flows into the cylinder, and said valve member has an inverted cup at its lower end which covers the nipple when the valve member is at the lower end of the cylinder.

5. Apparatus as set forth in claim 3 wherein said valve seat comprises an annular downwardly facing shoulder at the upper end of the cylinder and said valve member comprises a weight having a plastic disk at its upper end engageable with said shoulder.

6. Apparatus as set forth in claim 5 wherein the cylinder has an upwardly projecting nipple at its lower end through which liquid flows into the cylinder, and said valve member has an inverted cup at the lower end of said weight which covers the nipple when the valve member is at the lower end of the cylinder.

*7. Apparatus for dispensing measured dosage of a liquid, such as a liquid fumigant, comprising a cylinder having an upper end and a lower end and an inlet at one end and an outlet at its other end, a hose line for supplying liquid under pressure to the cylinder having a connection to the cylinder inlet, said cylinder having a valve seat at its outlet end, a valve member movable in the cylinder, the weight of the volume of the liquid in the cylinder displaced by the valve member being such in relation to the weight of the valve member that the valve member tends to move toward the inlet end of the cylinder, said valve member being adapted to move toward the outlet end of the cylinder in response to a pressure drop in the cylinder on the outlet side of the valve member and force out liquid through the cylinder outlet, said valve member, upon moving to the outlet end of the cylinder, being engageable with said valve seat to cut off flow from said outlet end of the cylinder, a delivery hose having a connection to the cylinder outlet, a manually operable delivery valve at the outer end of the delivery hose, and a by-pass for said valve member and providing for communication from the supply hose to the cylinder outlet on the outlet side of the valve seat, said by-pass being adapted to effect a pressure drop in the cylinder on*

*the outlet side of said valve member upon operation c said manually operable valve whereupon the valve men ber moves toward the outlet end of the cylinder to for a measured dosage of liquid out through the cylinder ou let and the delivery hose, and adapted to provide fc equalization of pressure on both sides of said valve men ber after the latter has moved into engagement with sa valve seat and said manually operable valve is release whereupon the valve member moves to the inlet end the cylinder.*

*8. Apparatus for dispensing measured dosages of liquid, such as a liquid fumigant, comprising a cylind having an upper end and a lower end and an inlet at or end and an outlet at its other end, a hose line for suppl ing liquid under pressure to the cylinder having a conne tion to the weight of the valve member that the val seat at its outlet end, a valve member movable in the cy inder, the weight of the volume of the liquid in the cy inder displaced by the valve member being such in rel tion tothe weight of the valve member that the val member tends to move toward the inlet end of the cyli der, said valve member being adapted to move towa the outlet end of the cylinder in response to a pressu drop in the cylinder on the outlet side of the valve mer ber and force out liquid through the cylinder outlet, sa valve member, upon moving to the outlet end of the cy inder, being engageable with said valve seat to cut off flc from said outlet end of the cylinder, a delivery hose ha ing a connection to the cylinder outlet, a manually op able delivery valve at the outer end of the delivery hose by-pass around the cylinder providing for communicati from the supply hose to the cylinder outlet on the out side of the valve seat, and a valve in the by-pass adapt to provide a restriction in the by-pass such as to effect pressure drop in the cylinder on the outlet side of sc valve member upon operation of said manually operal valve and adapted to provide for equalization of pressu on both sides of said valve member after the latter h moved into engagement with said valve seat and sc manually operable valve is closed, whereupon the va member moves to the inlet end of the cylinder.*

References Cited in the file of this patent or the original patent

UNITED STATES PATENTS

| | | |
|---|---|---|
| 2,614,853 | Manning | Oct. 21, 19 |
| 2,741,404 | Burton | Apr. 10, 19 |